United States Patent [19]

Mahyera et al.

[11] Patent Number: 4,480,842
[45] Date of Patent: Nov. 6, 1984

[54] SELF-ALIGNING STUFFING BOX

[76] Inventors: Anil Mahyera, 1730 Harvard Ave., Salt Lake City, Utah 84108; Robert M. Sweet, 1578 W. 11745 So., Riverton, Utah 84065; Carel J. H. Brest Van Kempen, 4920 Emigration Cyn., Salt Lake City, Utah 84108

[21] Appl. No.: 507,863

[22] Filed: Jun. 27, 1983

[51] Int. Cl.³ .................... F16J 15/18; F16J 15/40
[52] U.S. Cl. ............................ 277/22; 277/30; 277/59; 277/71; 277/169
[58] Field of Search ............ 277/3, 27, 30, 59, 5, 277/6, 70, 71, 169, 79, 198, 31, 22

[56] References Cited

U.S. PATENT DOCUMENTS

| | | | |
|---|---|---|---|
| 2,131,927 | 10/1938 | Wenzel | 277/59 X |
| 3,521,890 | 7/1970 | Holmes et al. | 277/59 X |
| 3,656,820 | 4/1972 | Pensa | 277/30 X |
| 3,971,565 | 7/1976 | Schickling et al. | 277/59 |
| 4,129,306 | 12/1978 | Konno et al. | 277/30 |
| 4,185,837 | 1/1980 | Greene | 277/27 |

Primary Examiner—Robert S. Ward

[57] ABSTRACT

A self-aligning stuffing box for use with a drilling device having a rotatable drill shaft includes a packing gland having an opening therethrough sized for passage of the rotatable drill shaft and includes packing rings for forming a seal between the packing gland and the drill shaft. A generally spherical exterior surface on the packing gland is supported by an interior spherical surface of a socket in a ball-and-socket like manner to enable the packing gland, packing rings and the rotatable drill shaft to pivot about the longitudinal axis of the rotatable drill shaft together. A frame slidably supports the socket and enables the socket, packing gland and packing ring means and rotatable drill shaft to be laterally displaced, with respect to the longitudinal axis of the drill shaft, as a single unit, in order to prevent damage to the packing rings by vibrational movement of the drill shaft during drilling.

13 Claims, 2 Drawing Figures

SELF-ALIGNING STUFFING BOX

The present invention is generally related to stuffing boxes for use with drilling devices for sealing a borehole around a rotating drill shaft, or pipe, to prevent leakage of any gas, drilling fluid or cuttings into the atmosphere during the drilling operation. More particularly, the invention is directed to a self-aligning stuffing box which enables the boring of holes in underground coal formations without leakage of methane gas and drilling fluid therefrom, while allowing the rotating drill shaft to pivot and/or be displaced from its centerline during the drilling operation.

Stuffing boxes for drill shafts typically have a number of resilient packing rings that are compressed against the drill shaft to provide a seal therebetween. However, packing rings having a density, or consistency, necessary to provide sufficient compression against the drill shaft to prevent leakage of fluid therepast generally do not have the capability of rapid dimensional change as is necessary to accommodate for movement of the drill shaft due to vibration thereof during drilling. In addition, to provide an effective seal it is important that the packing rings are durable and long-lived in order to minimize the amount of down time required to change the packing rings and/or stuffing box completely.

Previously, brass packing rings have been provided. However, the rotation of the drill shaft thereagainst, along with the normal vibration of the drill shaft, destroys these brass rings in a relatively short time, necessitating replacement.

A number of stuffing boxes have been developed, particularly in conjunction with the pumping of oil from underground reservoirs. For example, U.S. Pat. No. 3,887,196, entitled "Self-Aligning Stuffing Box" to Renfrow, shows a packing gland and socket arrangement having spherical surfaces thereon to enable rod misalignment accommodation while preventing oil from leaking therethrough. Such devices are significantly different than the self-aligning stuffing box of the present invention in that the rod is not rotated nor subject to the vibrations that a rotating drill shaft is subjected to. For example, transverse movement of the rod as would occur if the rod were vibrating would soon cause the packings therein to distort and wear, thereby causing the leakage of oil therepast despite the fact that the rod itself may be pivoted off-center during its transverse movement therethrough.

The self-aligning stuffing box of the present invention provides a service life and maintenance-free operation which are substantially longer than that of current designs. These advantages are achieved by enabling movement of the packing rings along with the drill shaft which prevents vibration and run-out of the drill shaft from damaging the packing rings; also, because the packing rings and drill shaft move together, deformation of the packing rings is substantially eliminated, thereby reducing the amount of wear. Further, the self-aligning stuffing box of the present invention enables the packing rings to be cooled and lubricated, which reduces the frictional load of the stuffing box against the drill shaft and also significantly reduces frictional degradation of the packing rings.

SUMMARY OF THE INVENTION

In accordance with the present invention, a self-aligning stuffing box for a drilling device having a rotatable drill shaft generally includes a packing gland, a socket and a frame.

The packing gland includes means defining an opening therethrough sized for passage of the rotatable drill shaft and means defining an exterior spherical surface thereon. In addition, the packing gland is configured for receiving packing ring means for forming a seal between the packing gland and the rotatable drill shaft.

Means defining an interior spherical surface on the socket are provided for engaging the packing gland exterior spherical surface in a ball-and-socket like manner to enable the packing gland, packing ring means and the rotatable drill shaft to pivot about the longitudinal axis of the rotatable drill shaft together.

The frame means slidably supports the socket and enables the socket, packing gland, packing ring means and rotatable drill shaft to be laterally displaced, with respect to the longitudinal axis of the drill shaft, as a single unit.

More particularly, the packing gland may be formed of stainless steel and the socket formed of bronze in order to minimize scoring on the sliding surfaces of these mating parts. As part of the packing ring means, means are provided for introducing a liquid between the packing means and the drill shaft for lubricating rubbing surfaces on the packing rings and the drill shaft.

Wiper ring means are provided between the drill shaft and the packing gland for preventing drill cuttings and drill fluid from entering the packing rings. Further, the frame means includes means defining a recess for receiving and slidably supporting an exterior circular flange on the socket for enabling the socket, packing gland, packing ring means and the rotatable drill shaft to be laterally displaced with respect to the longitudinal axis of the drill shaft, as a single unit.

BRIEF DESCRIPTION OF THE DRAWINGS

The advantages and features of the present invention will appear from the following description considered in conjunction with the accompanying drawings in which.

DETAILED DESCRIPTION

Figure 1:
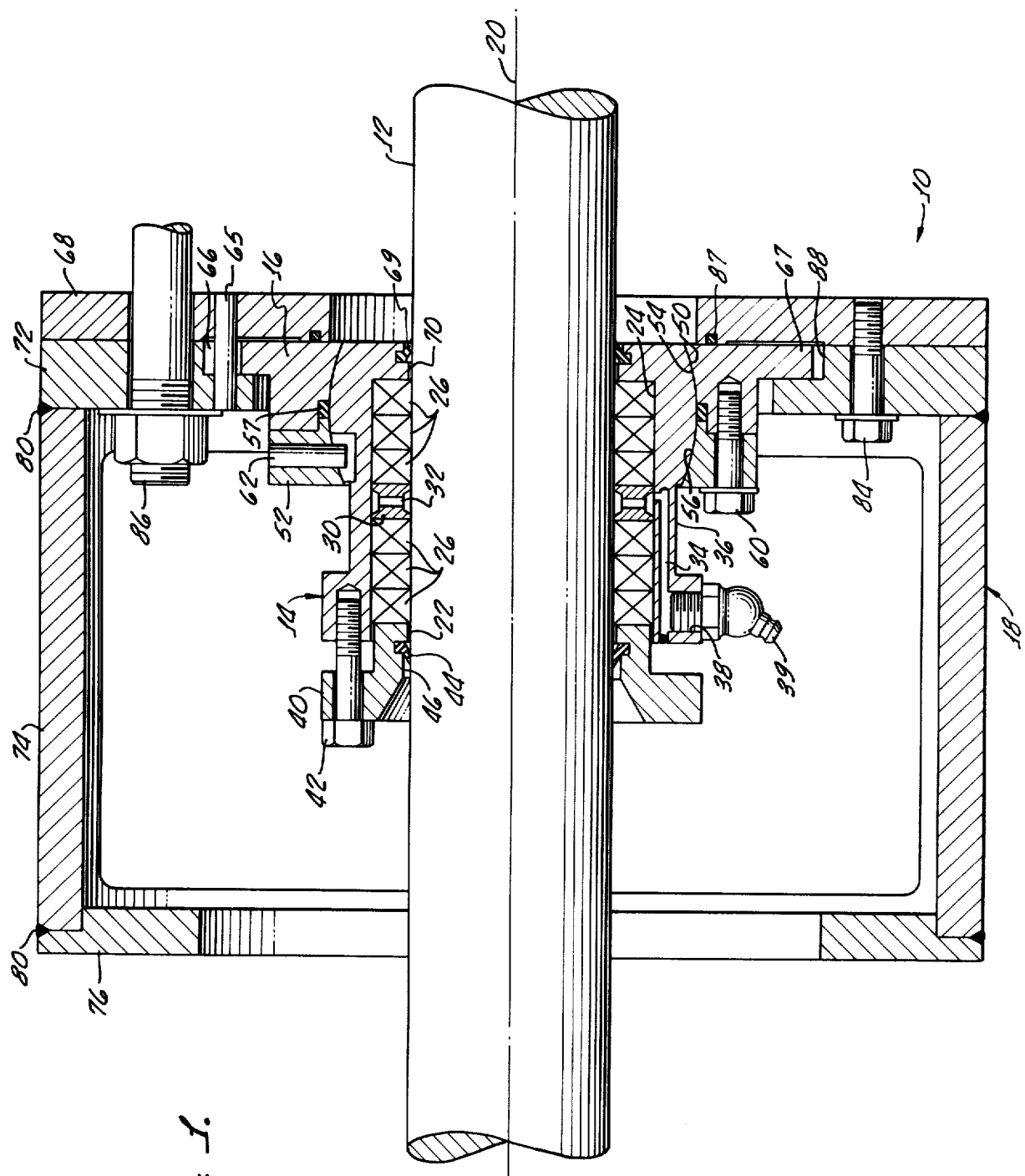
FIG. 1 is a cross-sectional view of the self-aligning stuffing box of the present invention, generally showing a packing gland, packing rings, a socket engaging an exterior spherical surface of the packing gland and a frame for slidably supporting the socket and the packing gland.
Figure 2:
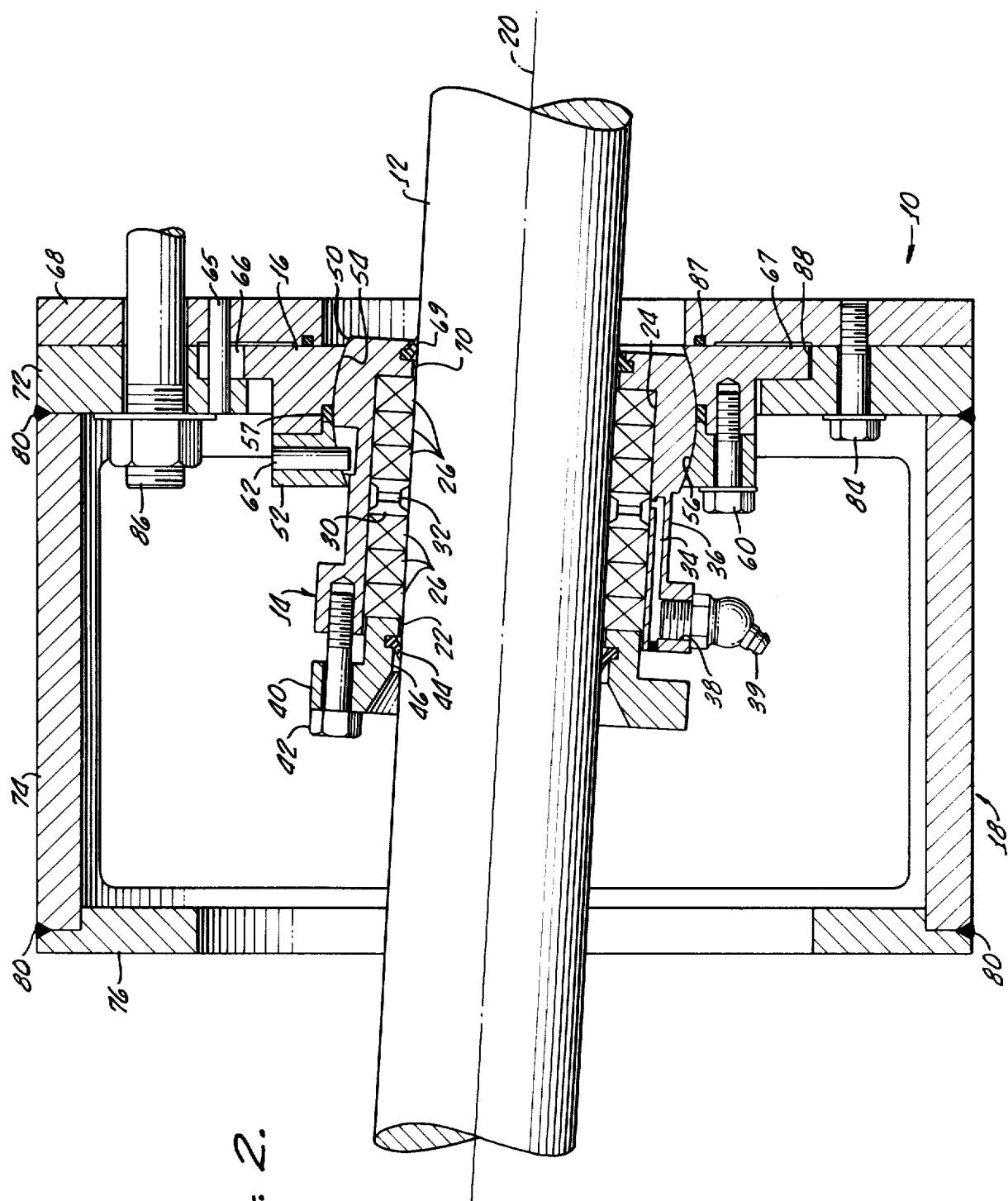
FIG. 2, similar to FIG. 1, shows the socket, packing gland and drill shaft pivoted and displaced about the longitudinal axis of the rotatable drill shaft.

Turning now to FIGS. 1 and 2, there is generally shown a self-aligning stuffing box 10 for a drilling device (not shown) having a rotatable drill shaft, or pipe, 12.

The self-aligning stuffing box 10 generally includes a packing gland 14, a socket 16, and a frame 18 which provides means for slidably supporting the socket 16 and for enabling the socket, packing gland and drill shaft to be laterally displaced with respect to the longitudinal axis 20 of the drill shaft as a single unit, as will be hereinafter discussed in greater detail.

The packing gland 14, which is preferably formed of stainless steel, is generally cylindrical and includes an opening 22 therethrough for passage of the drill shaft 12. An interior recess 24 is sized for receiving a plurality of packing rings 26 which are proportioned for bearing against the interior recess portion 24 of the packing gland 14, and the drill shaft 12 in order to form a seal therebetween. These packing rings may be formed of a graphite-impregnated fiber, or the like, as well known in the art, and have an interior diameter sized to accept a 2-3/16 inch diameter drill shaft.

It is to be appreciated that the self-aligning stuffing box 10 of the present invention may be sized to accommodate a number of drill shaft diameters. The dimensions of the stuffing box as shown in the figures herewith are proportioned for accepting a 2-3/16 inch outside diameter drill shaft, or pipe, as may be used for drilling long horizontal holes in underground formations such as in coal deposits for the purpose of draining methane gas from such holes.

Disposed with the packing rings 26 is a lantern ring 30 which provides means for introducing a liquid between the packing rings 26 and the drill shaft 12. The lantern ring 30 has an opening 32 therethrough which communicates with a passageway 34 through a side wall 36 of the packing gland 14. Communicating with an opening 38 in the side wall 36, the passageway 34 enables a liquid, such as aqueous cutting fluid, to be introduced to the lantern ring opening 32.

An inlet such as a quick connect nipple 39, in fluid communication with the opening 38, may be provided to connect the lantern ring 30 with an external source (not shown) of aqueous cutting fluid.

The liquid is introduced through the lantern ring opening 32 at a pressure sufficient to maintain flow of fluid between the packing rings and the drill shaft for both cooling and lubricating the rubbing surfaces on the packing glands and the drill shaft.

A compression flange 40 is secured to the packing gland 14 by means of bolts 42, the purpose of the compression flange being to compress and hold the packing rings within the packing gland. The bolts 42 provide means for adjusting the compression on the packing rings and enables rapid removal of the compression flange in order to replace the packing rings as necessary. The flange 40 may be in two parts (split) (not shown) to facilitate removal.

A wiper ring 44 may be attached to an interior surface 46 of the compression flange for bearing against the drill shaft 12 to prevent particles of dust and dirt which may be clinging to the shaft to be removed or wiped therefrom as the shaft 12 is transversely passed through the stuffing box 10 during the drilling operation.

The packing gland 14 includes an exterior spherical surface 50 thereon for engagement with the socket 16 in a ball-and-socket manner to enable the shaft, as well as the packing gland, to rotate about the longitudinal axis 20 of the drill shaft up to about 3 degrees for the configuration shown in FIG. 2. Greater rotation may be provided depending on the size of the stuffing box.

A socket clamp 52 is provided, and both the socket 16 and the socket clamp 52 have interior spherical surfaces 54, 56, which when assembled form a contiguous spherical surface for engagement with the packing gland exterior spherical surface 50. The socket 16 and socket clamp 52 may be formed of bronze in order to minimize scratching or scoring of the packing gland spherical surface 50.

Bolts 60 provide a means for removably attaching the socket clamp 52 to the socket 16 and for holding the packing gland exterior spherical surface 50 against the socket and socket clamp interior spherical surfaces 54, 56 while allowing the packing gland 14 to pivot therein about the drill shaft longitudinal axis 20. A pin 62 passes through the socket clamp 52 and engages a notch, or groove, 64 in the packing gland 14 to prevent rotation of the packing gland.

Similarly, a pin 65 passes through a notch 66 in an exterior circular flange 67 and is secured to a frame retaining plate 68 to prevent rotation of the socket, and socket clamp, with the drill shaft.

Although not shown in the drawings, lubrication of spherical surfaces 50, 54 and 56 may be provided by a grease fitting and a passageway communicating with the junction of the spherical surfaces 50, 54, 56.

Disposed between the socket 16 and the socket clasp 52, in a position for engaging the exterior surface 54 of the packing gland 14, is an O-ring 57 for providing a seal therebetween. The bolts 60 enable disassembly of the socket 16 and socket clamp 52 in order to replace the O-ring 57 as necessary.

Another wiper ring 69 is disposed on an interior surface 70 of the socket 16 at a position forward of the packing rings 26 in a position to bear against the drill shaft 12 and prevents large particles of drill cuttings from entering and damaging the packing rings. Both wiper rings 44, 60 may be formed of a resilient material such as rubber, or the like.

The exterior circular flange 67 slidably attaches the socket 16 to the frame 18, as will be hereinafter discussed in greater detail, and enables the socket 16, packing gland 14, packing rings 26 and the drill shaft 12 to be laterally displaced about the drill shaft longitudinal axis 20.

The frame 18, which may be formed of any suitable structural metal, generally includes the retaining plate 68, a slider flange 72, a standoff tube 74, and a mounting flange 76, the mounting flange, standoff tube and slider flange being welded as indicated by the character reference 80. The retaining plate is mounted to the slider flange by means of bolts 84, and the entire stuffing box may be mounted to a wellhead/borehole attachment such as a standpipe or the like. Alternately, the stuffing box may be mounted directly to the drilling rig (not shown).

Upon assembly, the slider flange and the retaining plate define a recess 88 therebetween for receiving and slidably supporting the socket 16 by the exterior circular flange 67, and an O-ring 87 provides a seal between the retaining plate 68 and the circular flange 67.

The diameter of the recess 88 has dimensions greater than the maximum diameter of the exterior circular flange 67, thereby enabling the sliding socket 16, along with the packing gland 14, packing rings 26 and the rotatable drill shaft 12, to be laterally displaced, with respect to the longitudinal axis 20 of the drill shaft, up to approximately 0.15 inches. Larger lateral displacement can be accommodated depending on the size of the stuffing box and the anticipated lateral displacement. In this manner, vibrational displacements of the drill shaft as drilling progresses are not translated directly onto the packing rings 26 because the packing gland, along with the packing rings, is allowed to laterally displace to accommodate such vibrational movement.

Although there has been described a specific arrangement of the self-aligning stuffing box in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art should be considered within the scope of the invention as defined by the appended claims.

What is claimed is:

1. A self-aligning stuffing box for a drilling device having a rotatable drill shaft comprising:
   a packing gland including means defining an opening therethrough sized for passage of the rotatable drill shaft, said packing gland being configured for receiving packing ring means for forming a seal between the packing gland and the rotatable drill shaft, said packing gland further including means defining an exterior spherical surface thereon;
   a socket having means defining an interior spherical surface thereon for engaging said packing gland exterior spherical surface in a ball-and-socket like manner to enable the packing gland, packing ring means and the rotatable drill shaft to pivot about the longitudinal axis of the rotatable drill shaft; and
   frame means for slidably supporting the socket and for enabling the socket, packing gland, packing ring means and rotatable drill shaft to be laterally displaced, with respect to the longitudinal axis of the drill shaft, as a single unit.

2. The self-aligning stuffing box of claim 1 further comprising clamp means, removably attached to the packing gland for compressing said packing ring means.

3. The self-aligning stuffing box of claim 1 wherein the packing ring means includes a plurality of packing rings and means for introducing a liquid between the packing rings and the drill shaft, said liquid being introduced at a pressure sufficient to maintain flow of liquid between the packing rings and the drill shaft for lubricating rubbing surfaces on the packing ring means and drill shaft.

4. The self-aligning stuffing box of claim 3 wherein the means for introducing a liquid between the packing rings and the drill shaft includes a lantern ring disposed adjacent said packing rings.

5. The self-aligning stuffing box of claim 4 wherein the lantern ring is sized to enable sufficient liquid to pass therethrough and between the packing rings and the drill shaft to cool the packing rings.

6. The self-aligning stuffing box of claim 5 further comprising wiper ring means for preventing drill cuttings and drilling fluid from entering the packing rings.

7. The self-aligning stuffing box of claim 6 further including means for forming a fluid seal between the socket and the frame means.

8. The self-aligning stuffing box of claim 7 further including means for forming a fluid seal between the packing gland and the sliding socket.

9. The self-aligning stuffing box of claim 1 wherein the socket includes an exterior circular flange thereon and the frame means includes means defining a recess for receiving and slidably supporting said exterior circular flange, said recess having dimensions greater than the exterior circular flange maximum diameter to enable the sliding socket, along with packing gland, packing ring means and the rotatable drill shaft to be laterally displaced.

10. The self-aligning stuffing box of claim 9 further comprising a socket clamp having an interior spherical surface thereon for engaging said packing gland, said socket and socket clamp, when assembled, forming a contiguous interior spherical surface, said socket clamp including means for removably attaching said socket clamp to said socket for holding said packing gland exterior spherical surface against the socket and socket clamp interior spherical surfaces.

11. The self-aligning stuffing box of claim 10 wherein the packing gland is formed of stainless steel and the socket and socket clamp are formed of bronze.

12. A self-aligning stuffing box for a drilling device having a rotatable drill shaft comprising:
    a stainless steel packing gland including means defining an opening therethrough sized for passage of the rotatable drill shaft, said packing gland being configured for receiving packing ring means for forming a seal between the packing gland and the rotatable drill shaft, said packing gland further including means defining an exterior spherical surface thereon, said packing ring means including a plurality of packing rings and means for introducing a liquid between the packing rings and the drill shaft;
    a bronze socket having an exterior flange thereon and means defining an interior spherical surface thereon for engaging said packing gland exterior spherical surface in a ball-and-socket like manner to enable the packing gland, packing ring means and the rotatable drill shaft to pivot, as a single unit, up to about three degrees about the longitudinal axis of the rotatable drill shaft;
    wiper ring means disposed between said drill shaft and said packing gland for preventing drill cuttings and drilling fluid from entering the packing rings; and
    frame means including means defining a recess for receiving and slidably supporting the socket by the exterior flange thereon and for enabling the socket, packing gland, packing ring means and rotatable drill shaft to be laterally displaced up to about 0.15 inches with respect to the longitudinal axis of the drill shaft, as a single unit.

13. A self-aligning stuffing box for a drilling device having a rotatable drill shaft comprising:
    a stainless steel packing gland including means defining an opening therethrough sized for passage of the rotatable drill shaft, said packing gland being configured for receiving packing ring means for forming a seal between the packing gland and the rotatable drill shaft, said packing gland further including means defining an exterior spherical surface thereon, said packing ring means including a plurality of packing rings and means for introducing a liquid between the packing rings and the drill shaft;
    clamp means, removably attached to the packing gland for compressing said packing ring means;
    a bronze socket having an exterior circular flange thereon and means defining an interior spherical surface thereon for engaging said packing gland exterior spherical surface in a ball-and-socket like manner to enable the packing gland, packing ring means and the rotatable drill shaft to pivot, as a single unit, up to about three degrees about the longitudinal axis of the rotatable drill shaft;
    a bronze socket clamp having an interior spherical surface thereon for engaging said packing gland, said socket and socket clamp, when assembled, forming a contiguous interior spherical surface, said socket clamp including means for removably attaching said socket clamp to said socket for holding said packing gland exterior spherical surface against the socket and socket clamp interior spherical surfaces;

wiper ring means disposed between said drill shaft and said packing gland for preventing drill cuttings and drilling fluid from entering the packing rings; and frame means including means defining a recess for receiving and slidably supporting the socket by the exterior circular flange thereon and for enabling the socket, packing gland, packing ring means and rotatable drill shaft to be laterally displaced up to about 0.15 inches with respect to the longitudinal axis of the drill shaft, as a single unit.

* * * * *

UNITED STATES PATENT AND TRADEMARK OFFICE
CERTIFICATE OF CORRECTION

PATENT NO. : 4,480,842
DATED : Nov. 6, 1984
INVENTOR(S) : Anil Mahyera, Robert M. Sweet, Carel J.H. Brest Van Kempen It is certified that error appears in the above—identified patent and that said Letters Patent is hereby corrected as shown below:

Add to Title Page the Following:

ASSIGNEE: METHANE DRAINAGE VENTURES, Placentia, California

ATTORNEY, AGENT OR FIRM: FOWLER, LAMBERT & HACKLER

Signed and Sealed this

Fourth Day of June 1985

[SEAL]

*Attest:*

DONALD J. QUIGG

*Attesting Officer*       *Acting Commissioner of Patents and Trademarks*